(12) United States Patent
Wang et al.

(10) Patent No.: US 12,046,723 B2
(45) Date of Patent: Jul. 23, 2024

(54) BATTERY

(71) Applicant: Tianjin Lishen Battery Joint-Stock Co., Ltd., Tianjin (CN)

(72) Inventors: Nianju Wang, Tianjin (CN); Yuanyuan Ya, Tianjin (CN); Xueheng Jia, Tianjin (CN); Minghui Xu, Tianjin (CN); Dongfang Miao, Tianjin (CN)

(73) Assignees: TIANJIN LISHEN BATTERY JOINT-STOCK CO., LTD., Tianjin (CN); TIANJIN JUYUAN NEW ENERGY TECHNOLOGY CO., LTD., Tianjin (CN)

( * ) Notice: Subject to any disclaimer, the term of this patent is extended or adjusted under 35 U.S.C. 154(b) by 524 days.

(21) Appl. No.: 17/401,304

(22) Filed: Aug. 12, 2021

(65) Prior Publication Data

US 2022/0102766 A1 Mar. 31, 2022

Related U.S. Application Data

(63) Continuation-in-part of application No. PCT/CN2020/131695, filed on Nov. 26, 2020.

(30) Foreign Application Priority Data

Sep. 30, 2020 (CN) .......................... 202011068885.0

(51) Int. Cl.
*H01M 10/00* (2006.01)
*H01M 10/0525* (2010.01)
(Continued)

(52) U.S. Cl.
CPC ... *H01M 10/4257* (2013.01); *H01M 10/0525* (2013.01); *H01M 10/0587* (2013.01);
(Continued)

(58) Field of Classification Search
CPC .......... H01M 10/0525; H01M 50/107; H01M 50/604; H01M 50/119
See application file for complete search history.

(56) References Cited

FOREIGN PATENT DOCUMENTS

KR 20160131271 A * 11/2016 ........ H01M 10/4285

OTHER PUBLICATIONS

Lee et al., Nail for Penetration Test of Secondary Battery and Secondary Battery Penetration Test Device Using Thereof, Nov. 16, 2016, See the Abstract. (Year: 2016).*

* cited by examiner

*Primary Examiner* — Cynthia H Kelly
*Assistant Examiner* — Monique M Wills
(74) *Attorney, Agent, or Firm* — MATTHIAS SCHOLL P.C.; Matthias Scholl (57) ABSTRACT

A battery, including an electrode assembly including a central hole, at least one positive electrode, at least one negative electrode, and at least one diaphragm separating the at least one positive electrode from the at least one negative electrode. The at least one positive electrode, the at least one negative electrode and the at least one diaphragm are disposed around the central hole in a spiral winding manner. The central hole has a diameter of greater than 0 and smaller than that of the battery. A pin assembly is disposed in the central hole. The pin assembly includes a housing including an axial through hole. The housing is partially or fully disposed in the central hole. At least one integrated circuit device is disposed in the axial through hole. The at least one integrated circuit device includes at least one access terminal and one output terminal.

23 Claims, 11 Drawing Sheets

(51) Int. Cl.
*H01M 10/0587* (2010.01)
*H01M 10/42* (2006.01)
*H01M 50/107* (2021.01)
*H01M 50/119* (2021.01)
*H01M 50/645* (2021.01)

(52) U.S. Cl.
CPC ..... *H01M 10/4264* (2013.01); *H01M 50/107* (2021.01); *H01M 50/119* (2021.01); *H01M 50/645* (2021.01); *H01M 2010/4271* (2013.01)

BATTERY

CROSS-REFERENCE TO RELATED APPLICATIONS

This application is a continuation-in-part of International Patent Application No. PCT/CN2020/131695 with an international filing date of Nov. 26, 2020, designating the United States, now pending, and further claims foreign priority benefits to Chinese Patent Application No. 202011068885.0 filed Sep. 30, 2020. The contents of all of the aforementioned applications, including any intervening amendments thereto, are incorporated herein by reference.

BACKGROUND

The disclosure relates to a battery.

A lithium-ion battery is a secondary battery and works based on lithium ions moving between the positive electrode and the negative electrode of the battery.

The lithium-ion battery of a terminal product includes a battery that has charge-discharge function, and a power management circuit. The power management circuit usually prevents the battery from being overcharged and overdischarged, avoids abuse in inappropriate temperature environments, and monitors battery capacity. Generally, the power management circuit and the battery are two independent components, and each occupies a part of space of the battery. For example, an 18650-type cylindrical battery includes an 18650-type battery and a power management circuit board positioned on the side thereof. The power management circuit board has a width of about 4 mm and a thickness of about 1.8 mm.

Currently, the formation of the polarity assembly of a cylindrical battery has two processes: winding and lamination. Practice has proved that a winding structure has the best energy density. When a cylindrical polarity assembly is molded by winding, a central hole, generally with a diameter of greater than 1 mm, is formed due to the presence of a winding needle. The central hole wastes battery space and cause the structure of the polarity assembly to collapse when in use. Therefore, a pin is usually disposed in the central hole to stabilize the polarity assembly, which makes the process complex.

SUMMARY

To solve the aforesaid problems, an objective of the disclosure is to provide a battery.

To achieve the aforesaid objective, the disclosure provides a battery, comprising:

an electrode assembly comprising a central hole, at least one positive electrode, at least one negative electrode, and at least one diaphragm separating the at least one positive electrode from the at least one negative electrode. The at least one positive electrode, the at least one negative electrode and the at least one diaphragm are disposed around the central hole in a spiral winding manner. The central hole has a diameter of greater than 0 and smaller than that of the battery.

A pin assembly is disposed in the central hole for power management; the pin assembly comprises a housing comprising an axial through hole; the housing is partially or fully disposed in the central hole; at least one integrated circuit device is disposed in the axial through hole; the at least one integrated circuit device comprises at least one access terminal and at least one output terminal; the at least one positive electrode and/or the at least one negative electrode is conductively connected to the access terminal, thus achieving polarity separation and power management function of the battery.

A battery housing is hermetically connected to the housing, thus forming a ring-shaped sealed cavity for accommodating the electrode assembly.

In a class of this embodiment, the housing has a longitudinal section in the shape of "][" and comprises a tube and a disc-shaped flange extending outwardly from the top of the tube, and the axial through hole is disposed in the tube.

In a class of this embodiment, the battery housing has a U-shaped longitudinal section and a circular cross section.

In a class of this embodiment, the housing has a longitudinal section in the shape of "⊓⊓" and comprises a tube and two circular tubes extending outwardly from two end of the top of the tube, and the axial through hole is disposed in the tube.

In a class of this embodiment, the battery housing is in the shape of a disc, and has a longitudinal section in the shape of "-".

In a class of this embodiment, the housing has a longitudinal section in the shape of "||" and comprises a circular tube, and the axial through hole is disposed in the circular tube.

In a class of this embodiment, the battery housing has a longitudinal section in the shape of "▫".

In a class of this embodiment, the battery further comprises a liquid injection hole for injecting electrolyte into the battery.

In a class of this embodiment, the liquid injection hole is disposed in the central hole and/or is disposed on the disc-shaped flange and/or on the battery housing, and/or is a gap between the pin assembly and the battery housing before sealing.

In a class of this embodiment, the liquid injection hole is sealed with a sealing member to prevent the electrolyte from leaking out through the liquid injection hole.

In a class of this embodiment, the sealing member comprises one of the following structures:

1) The sealing member comprises an end cap structure. The end cap structure comprises an end and an embedded part disposed at the lower end of the end. The end covers the liquid injection hole, and the embedded part is disposed in the liquid injection hole.

2) The sealing member comprises at least one steel ball. The at least one steel ball is disposed in the liquid injection hole in an interference fit.

In a class of this embodiment, the battery is a lithium-ion battery and further comprises at least one lithium intercalated electrode.

In a class of this embodiment, the at least one positive electrode, the at least one negative electrode, and the at least one diaphragm each are in the form of a flat strip.

In a class of this embodiment, the components in the electrode assembly are arranged in the following order:

the negative electrode/the diaphragm/the positive electrode/the diaphragm; or the positive electrode/the diaphragm/the negative electrode/the diaphragm.

In a class of this embodiment, the pin assembly and the battery housing comprise a waterproof material.

In a class of this embodiment, the waterproof material is a metal material or a non-metal material.

In a class of this embodiment, the metal material is stainless steel, aluminum, or aluminum alloy.

In a class of this embodiment, the non-metal material is ceramic or plastic.

In a class of this embodiment, the at least one integrated circuit device offers protection against overcharging, over-discharging, overcurrent, and short circuit. The at least one integrated circuit device comprises a protective part and a connection part. The protective part includes, but is not limited to, a printed circuit board (PCB), an integrated circuit (IC), a metal-oxide-semiconductor field-effect transistor (MOS), a negative temperature coefficient (NTC) thermistor, a positive temperature coefficient (PTC) thermistor, a thermal cutoff (TCO), a resistor, and a capacitor. The connection part comprises a PCB, a flexible printed circuit (FPC), a connector, and a nickel tape.

The IC chip is an integrated circuit chip for monitoring the voltage and current of a closed loop of the battery.

The metal-oxide-semiconductor field-effect transistor (MOS) is a protection circuit module configured to open and close the closed loop of the battery loop.

The resistor is disposed in series, in parallel, or in a combination thereof in the integrated circuit, and is mainly configured to divide voltage and limit current.

The capacitor is disposed in series or in parallel in the integrated circuit, and is configured to store charges in the circuit for voltage stabilization, and can also be used for coupling, decoupling, bypassing, filtering, etc.

NTC is a negative temperature coefficient thermistor, and the higher the temperature, the lower the resistance thereof.

PTC is a positive temperature coefficient thermistor, and the higher the temperature, the higher the resistance thereof.

The thermal cutoff (TCO) is a temperature switch configured to protect a battery from overheating.

In a class of this embodiment, the battery has a circular or elliptical cross section.

In a class of this embodiment, the pin assembly further comprises an insulating part for separating the housing from the at least one integrated circuit device.

Compared with the related art, the polarity separation and power management of the battery of the disclosure is achieved in the central hole of the electrode assembly. The at least one integrated circuit devices configured to protect the battery cell disposed in the central hole. The positive electrode and/or negative electrode is conductively connected to the access terminal of the integrated circuit, and the output terminal of the integrated circuit is used as a lead-out terminal of the positive electrode and/or negative electrode. The integrated circuit has both the polarity separation function and the power management function of the battery.

For example, the positive electrode is led out from the central hole of the electrode assembly. The negative electrode is conductively connected to the metal housing. The positive polarity of the battery is an output terminal of the integrated circuit that is led from the central hole, and the negative polarity is the metal housing.

For example, the negative electrode is led out from the central hole of the electrode assembly. The negative electrode is conductively connected to the metal housing. The polarity of the positive electrode of the battery is the metal housing, and the polarity of the negative electrode is the output terminal of the integrated circuit that is led from the central hole.

For example, both the positive electrode and the negative electrode are led out from the central hole of the electrode assembly through the integrated circuit, and the positive and negative polarities of the battery are the corresponding output terminals of the integrated circuit.

The pin assembly and the battery housing comprise waterproof materials.

The battery housing is configured for sealed connection with the pin assembly, thereby forming a ring-shaped cavity. The electrode assembly is disposed in the ring-shaped cavity that provides a stable working environment for the electrochemical components. The battery of the disclosure may be assembled using plastic sealing and soldering.

The battery housing and the housing comprise at least one liquid injection hole through which the electrolyte is injected into the battery. A sealing member is disposed at the at least one liquid injection hole so as to prevent the electrolyte from leaking out the battery.

BRIEF DESCRIPTION OF THE DIAGRAMS

DESCRIPTION OF THE INVENTION

To further illustrate, embodiments detailing a battery are described below. It should be noted that the following embodiments are intended to describe and not to limit the disclosure.

Example 1

As shown in FIGS. 1 and 9-11, a battery comprises an electrode assembly and a battery housing.

Figure 1:
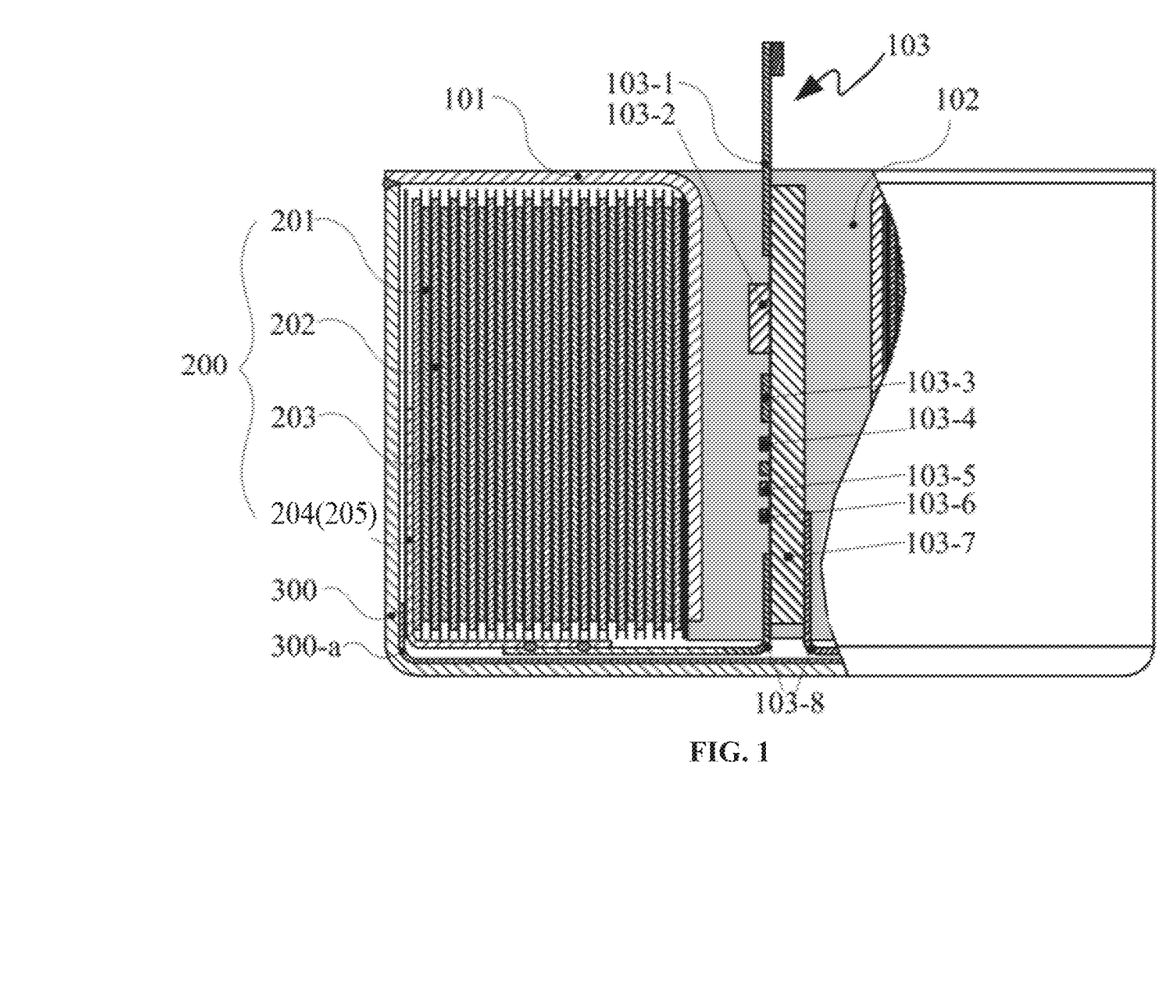
FIG. 1 is a schematic diagram of a battery of Example 1 of the disclosure.

The electrode assembly 200 comprises a central hole, at least one positive electrode 201, at least one negative electrode 202, and a diaphragm 203 separating the positive electrode and the negative electrode. The positive electrode 201, the negative electrode 202 and the diaphragm 203 are disposed around the central hole in a spiral winding manner. The central hole has a diameter greater than 0 and smaller than that of the battery.

One pin assembly is disposed in the central hole for power management. The pin assembly comprises a housing 101 comprising an axial through hole. The housing 101 is partially inserted into the central hole. The pin assembly further comprises an insulating part 102 for separating the housing from an integrated circuit device 103. The power management component comprises tab adapters 103-8, a PCB 103-7, a FPC 103-1, an integrated circuit (IC) chip 103-2, a MOS 103-3, a resistor 103-4, a capacitor 103-5, a NTC 103-6, a PTC, a TCO, and other components according to actual needs. The PTC and TCO are not disposed as needed. The insulating part 102 is loaded in the axial through hole of the housing 101. The integrated circuit device 103 penetrates through the insulating part 102. The positive electrode 201 and the negative electrode 202 are both conductively connected to the tab adapters 103-8, thereby protecting the battery.

The battery housing 300 is hermetically connected to the housing, thus forming a ring-shaped sealed cavity for accommodating the electrode assembly.

The electrode assembly 200 further comprises a first transition conductor 204 and a second transition conductor 205 which are connected to the two tab adapters 103-8, respectively. The other end of the first transition conductor 204 is connected to the positive electrode 201 and the other end of the second transition conductor is connected to the negative electrode 202. Alternatively, the two tab adapters 103-8 are respectively connected to two thin copper/aluminum foils instead of the first transition conductor 204 and the second transition conductor 205.

The insulating part 102 is partially loaded in the axial through hole. The insulating part 102 has a longitudinal section in the shape of "⊥", and comprises a columnar part inserted into the axial through hole and an end cap that extends outwardly from the bottom of the columnar part so as to fully cover the lower end surface of axial through hole. This structure prevents contact of the lower end surface of the axial through-hole with the two tab adapters 103-8 and thus prevents a short circuit. The insulating part can also be fully inserted into the axial through hole, leaving only the columnar part, and can also be beyond an upper housing and extend outward to form an "I" shape. Such a transformation also falls in the scope of protection of this application.

It should be noted that a layer of insulating tape 300-a is disposed on the inner surface of the bottom end of the battery housing 300 to prevent a short circuit from occurring between the two tab adapters 103-8 and the battery housing 300, and also to prevent the short circuit from occurring among the first transition conductor 204, the second transition conductor 205, and the battery housing 300.

Figure 4:
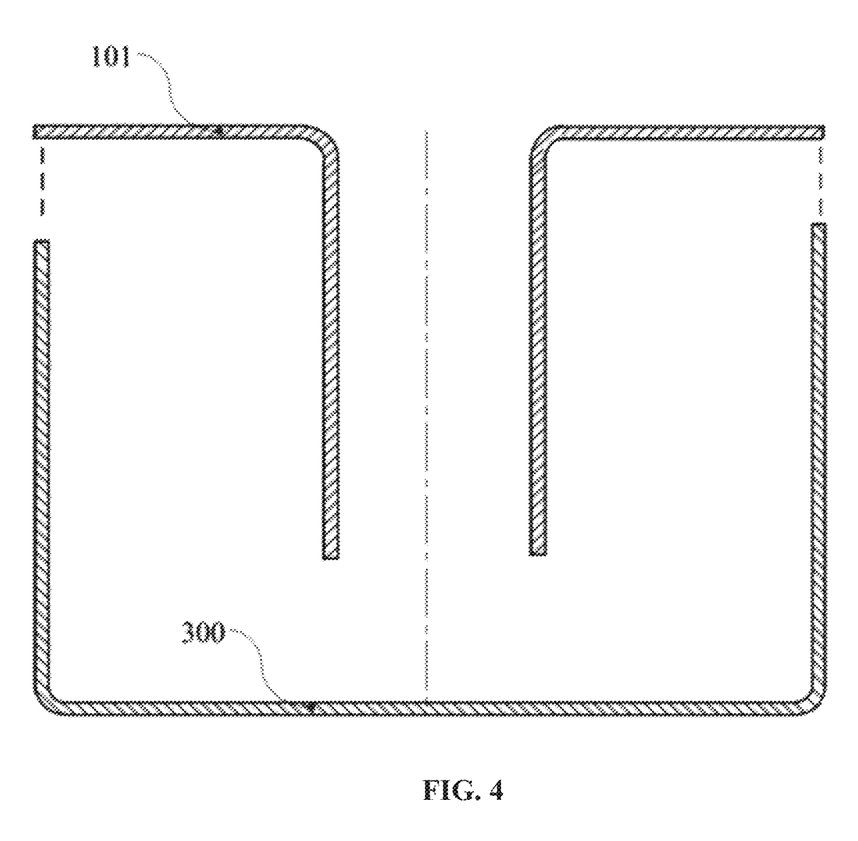
FIG. 4 is a schematic diagram of a connection between a battery housing and a housing of Example 1 of the disclosure.

As shown in FIG. 4, the housing 101 has a longitudinal cross section in a shape of "][", and comprises a tube and a disc-shaped flange extending outwardly from the top of the tube. The axial through hole is disposed in the tube. The battery housing 300 has a U-shaped longitudinal section. The battery housing 300 is spliced or integrally formed with the housing 101.

Example 2

As shown in FIGS. 2 and 9-11, the example and Example 1 are the same except for the structures of the battery housing 300 and the housing 101.

Figure 2:
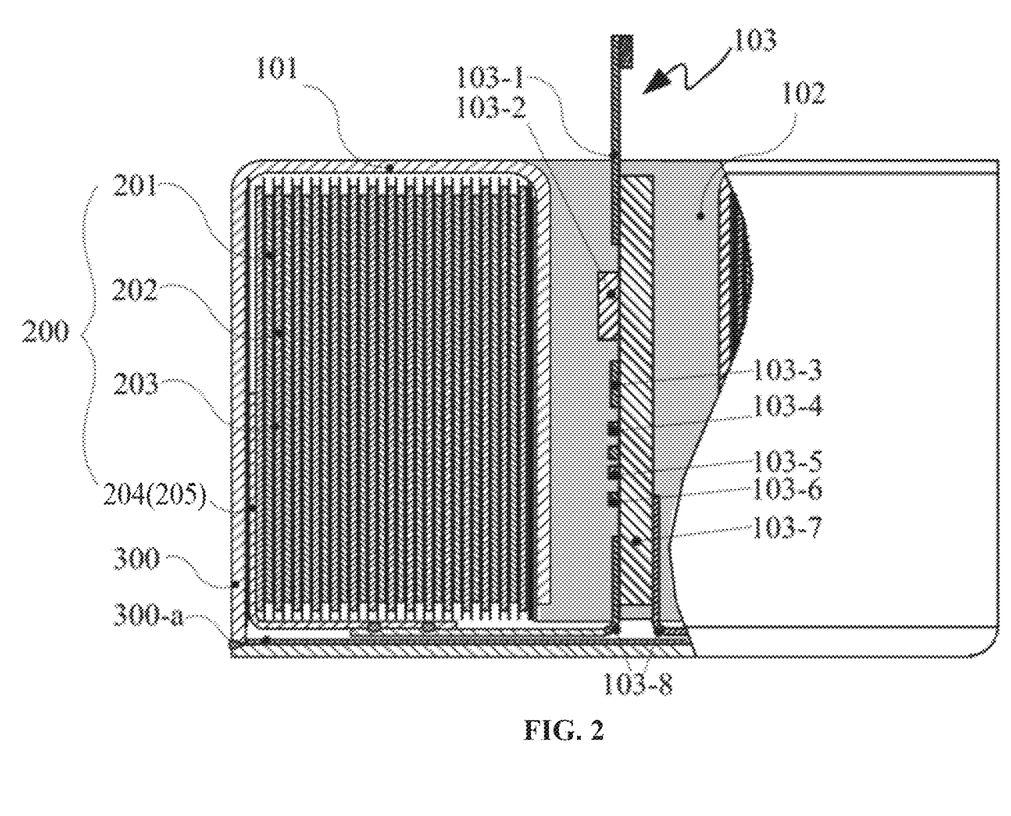
FIG. 2 is a schematic diagram of a battery of Example 2 of the disclosure.

An electrode assembly 200 comprises a central hole, at least one positive electrode 201, at least one negative electrode 202, and a diaphragm 203 separating the positive electrode and the negative electrode. The positive electrode 201, the negative electrode 202 and the diaphragm 203 are disposed around the central hole in a spiral winding manner. The central hole has a diameter greater than 0 and smaller than that of the battery.

One pin assembly is disposed in the central hole for power management. The pin assembly comprises a housing 101 comprising an axial through hole. The housing 101 is partially inserted into the central hole. The pin assembly further comprises an insulating part 102 for separating the housing from the integrated circuit device 103. The power management component comprises tab adapters 103-8, a PCB 103-7, a FPC 103-1, an integrated circuit (IC) chip 103-2, a MOS 103-3, a resistor 103-4, a capacitor 103-5, a NTC 103-6, a PTC, a TCO, or other components according to actual needs. The PTC and TCO are not disposed as needed. The insulating part 102 is loaded in the axial through hole of the housing 101. The integrated circuit device 103 penetrates through the insulating part 102. The positive electrode 201 and the negative electrode 202 are both conductively connected to the tab adapter 103-8, thereby protecting the battery.

The battery housing 300 is hermetically connected to the housing, thus forming a ring-shaped sealed cavity for accommodating the electrode assembly.

The electrode assembly 200 further comprises a first transition conductor 204 and a second transition conductor 205 which are connected to the two tab adapters 103-8, respectively. The other end of the first transition conductor 204 is connected to the positive electrode 201 and the other end of the second transition conductor is connected to the negative electrode 202. Alternatively, the two tab adapters 103-8 are respectively connected to two thin copper/aluminum foils instead of the first transition conductor 204 and the second transition conductor 205.

The insulating part 102 is partially loaded in the axial through hole. The insulating part 102 has a longitudinal section in the shape of "⊥", and comprises a columnar part inserted into the axial through hole and an end cap that extends outwardly from the bottom of the columnar part so as to fully cover the lower end surface of axial through hole. This structure prevents contact of the lower end surface of the axial through-hole with the two tab adapters 103-8 and thus prevents a short circuit. The insulating part can also be fully inserted into the axial through hole, leaving only the columnar part, and can also be beyond an upper housing and extend outward to form an "I" shape. Such a transformation also falls in the scope of protection of this application.

It should be noted that a layer of insulating tape 300-a is disposed on the inner surface of the bottom end of the battery housing 300 to prevent a short circuit from occurring between the two tab adapters 103-8 and the battery housing 300, and also to prevent the short circuit from occurring among the first transition conductor 204, the second transition conductor 205, and the battery housing 300.

Figure 5:
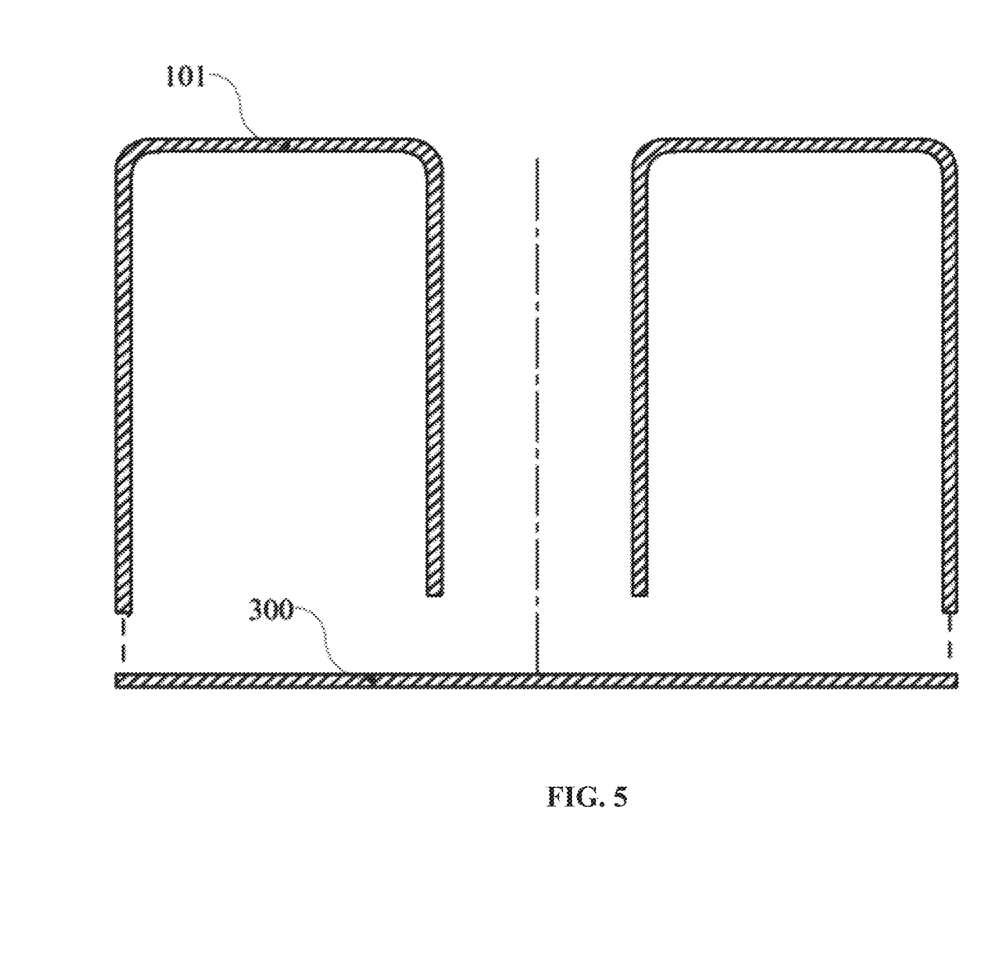
FIG. 5 is a schematic diagram of a connection between a battery housing and a housing of Example 2 of the disclosure.

As shown in FIG. 5, the housing 101 has a longitudinal section in the shape of "⊔" and comprises a tube and two circular tubes extending outwardly from two end of the top of the tube. The axial through hole is disposed in the tube. The battery housing is in the shape of a disc and has a longitudinal section in the shape of "-". The battery housing 300 is spliced or integrally formed with the housing 101.

Example 3

As shown in FIGS. 3 and 9-11, the example, Example 1 and Example 2 are the same except for the structures of the battery housing 300 and the housing 101.

Figure 3:
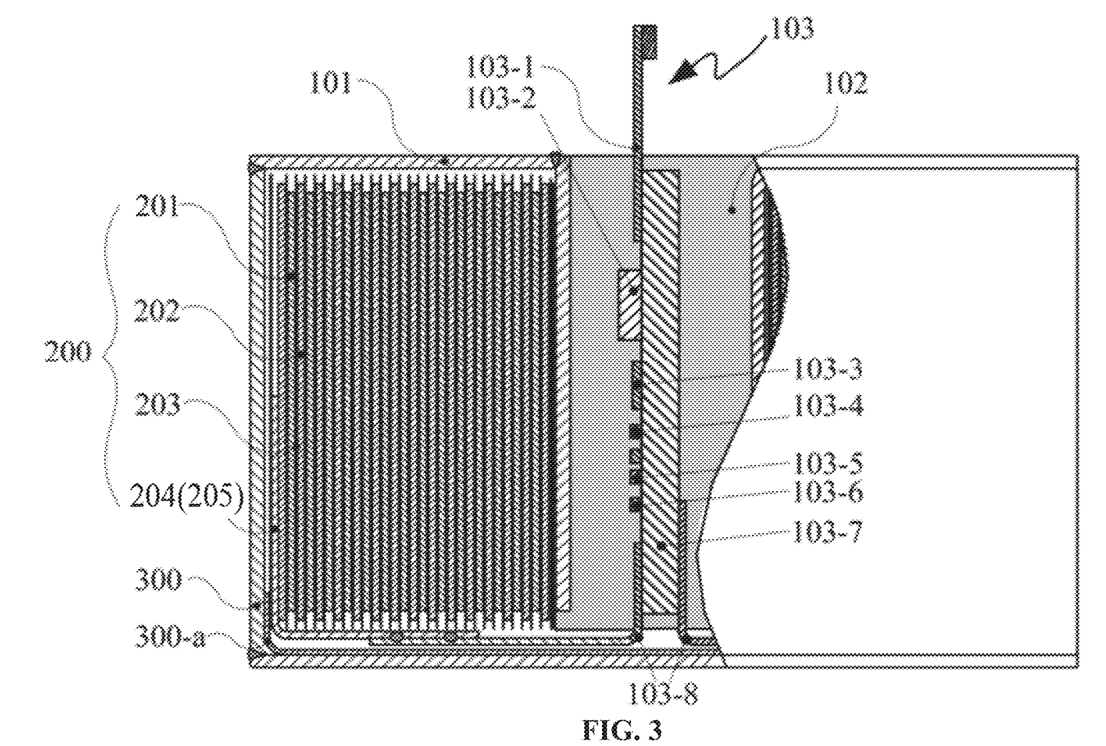
FIG. 3 is a schematic diagram of a battery of Example 3 of the disclosure.

An electrode assembly 200 comprises a central hole, at least one positive electrode 201, at least one negative electrode 202, and a diaphragm 203 separating the positive electrode and the negative electrode. The positive electrode 201, the negative electrode 202 and the diaphragm 203 are disposed around the central hole in a spiral winding manner. The central hole has a diameter greater than 0 and smaller than that of the battery.

One pin assembly is disposed in the central hole for power management. The pin assembly comprises a housing 101 comprising an axial through hole. The housing 101 is partially inserted into the central hole. The pin assembly further comprises an insulating part 102 for separating the housing from the integrated circuit device 103. The power management component comprises tab adapters 103-8, a PCB 103-7, a FPC 103-1, a power-protection device IC chip 103-2, a MOS 103-3, a resistor 103-4, a capacitor 103-5, NTC 103-6, a PTC, a TCO, or other components according to actual needs. The PTC and TCO are not disposed as needed. The insulating part 102 is loaded in the axial through hole of the housing 101. The integrated circuit device 103 penetrates through the insulating part 102. The positive electrode 201 and the negative electrode 202 are both conductively connected to the tab adapter 103-8 of the power management component, thereby protecting the battery.

The battery housing 300 is hermetically connected to the housing, thus forming a ring-shaped sealed cavity for accommodating the electrode assembly.

The electrode assembly 200 further comprises a first transition conductor 204 and a second transition conductor 205 which are connected to the two tab adapters 103-8, respectively. The other end of the first transition conductor 204 is connected to the positive electrode 201 and the other end of the second transition conductor is connected to the negative electrode 202. Alternatively, the two tab adapters 103-8 are respectively connected to two thin copper/aluminum foils instead of the first transition conductor 204 and the second transition conductor 205.

The insulating part 102 is partially loaded in the axial through hole. The insulating part 102 has a longitudinal section in the shape of " 凸 ", and comprises a columnar part inserted into the axial through hole and an end cap that extends outwardly from the bottom of the columnar part so as to fully cover the lower end surface of axial through hole. This structure prevents contact of the lower end surface of the axial through-hole with the two tab adapters 103-8 and thus prevents a short circuit. The insulating part can also be all disposed into the axial through hole, leaving only the columnar part, and can also be beyond an upper housing and extend outward to form an "I" shape. Such a transformation also falls in the scope of protection of this application.

It should be noted that a layer of insulating tape 300-a is disposed on the inner surface of the bottom end of the battery housing 300 to prevent a short circuit from occurring between the two tab adapters 103-8 and the battery housing 300, and also to prevent the short circuit from occurring among the first transition conductor 204, the second transition conductor 205, and the battery housing 300.

Figure 6:
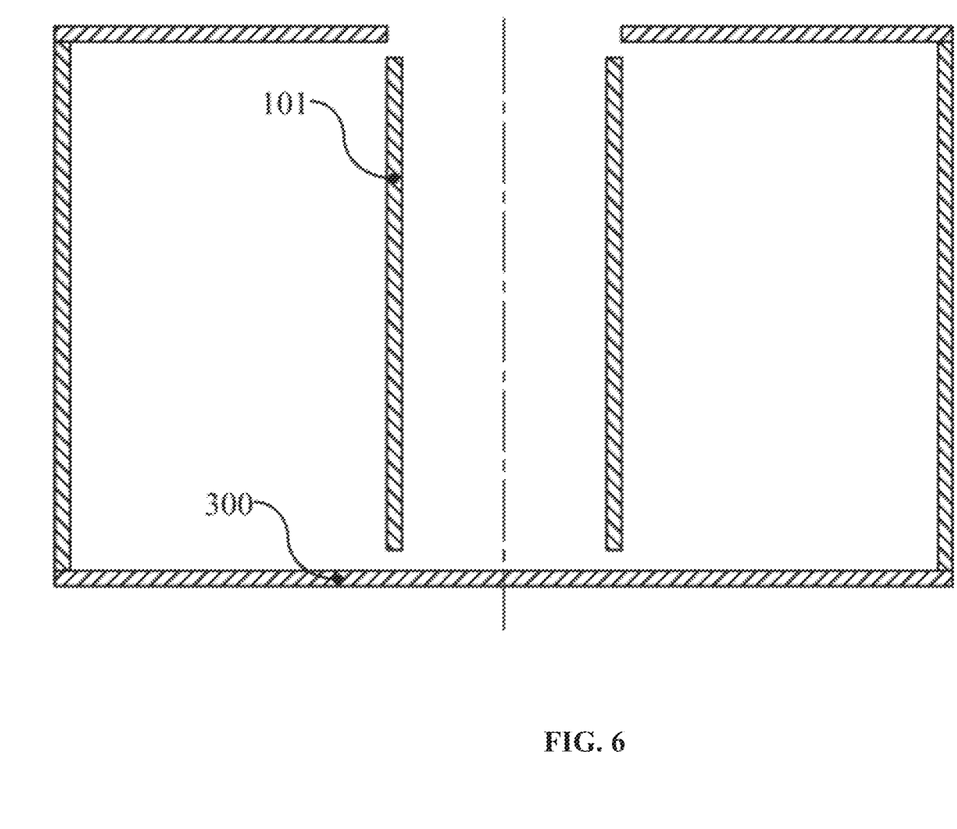
FIG. 6 is a schematic diagram of a connection between a battery housing and a housing of Example 3 of the disclosure.

As shown in FIG. 6, the housing 101 has a longitudinal section in the shape or "||" and comprises a circular tube. The axial through hole is disposed in the circular tube. The battery housing 300 has a longitudinal section in the shape of " ⊏⊐ ". The housing 101 is integrally formed or spliced together. In the example, the battery housing 300 is formed by splicing.

Example 4

Figure 7:
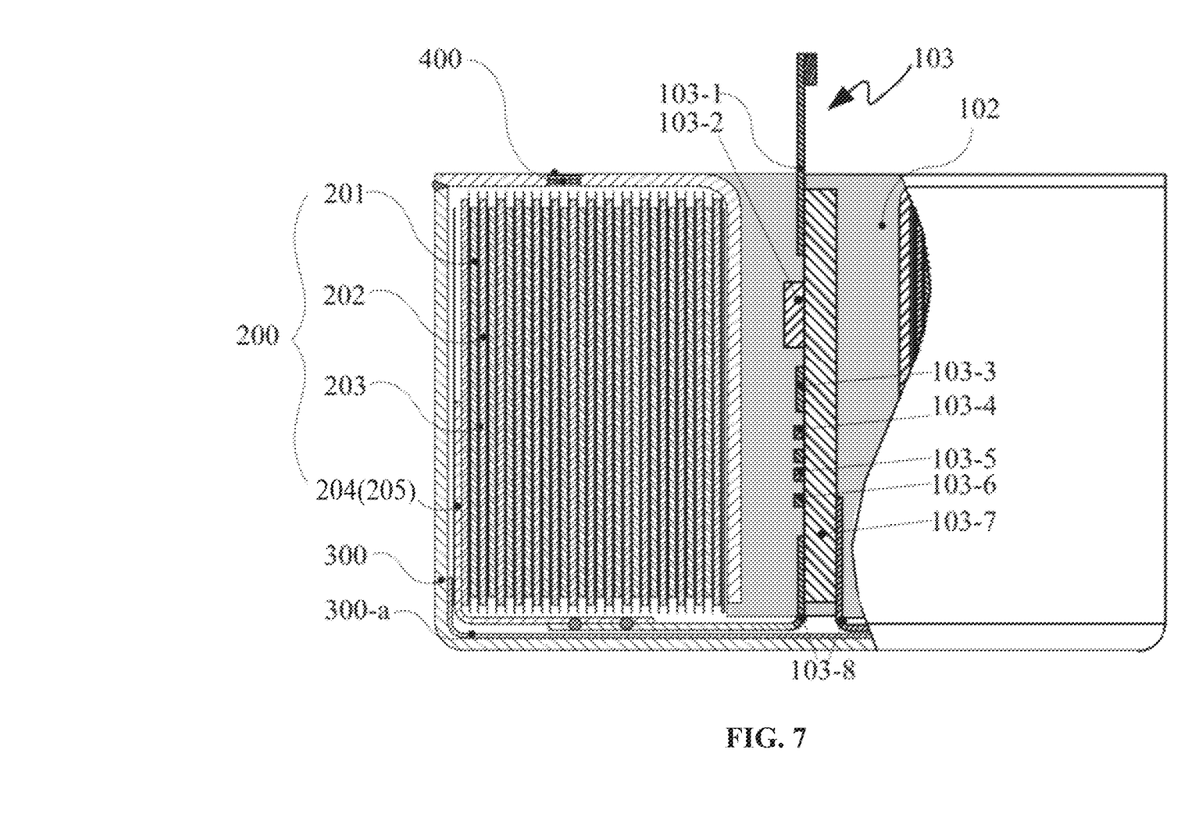
FIG. 7 is a schematic diagram of a battery of Example 4 of the disclosure.

As shown in FIG. 7, the example is modified based on Example 1, Example 2, and Example 3, respectively. In this example, a liquid injection hole 400 is disposed on the battery housing 300. Those skilled in the art will appreciate from the disclosure herein that the liquid injection hole 400 can also be disposed in other locations of the battery housing 300, and/or on the pin assembly and the insulating part.

The other structures of the example are similar to Example 1, Example 2, and Example 3.

Figure 8:
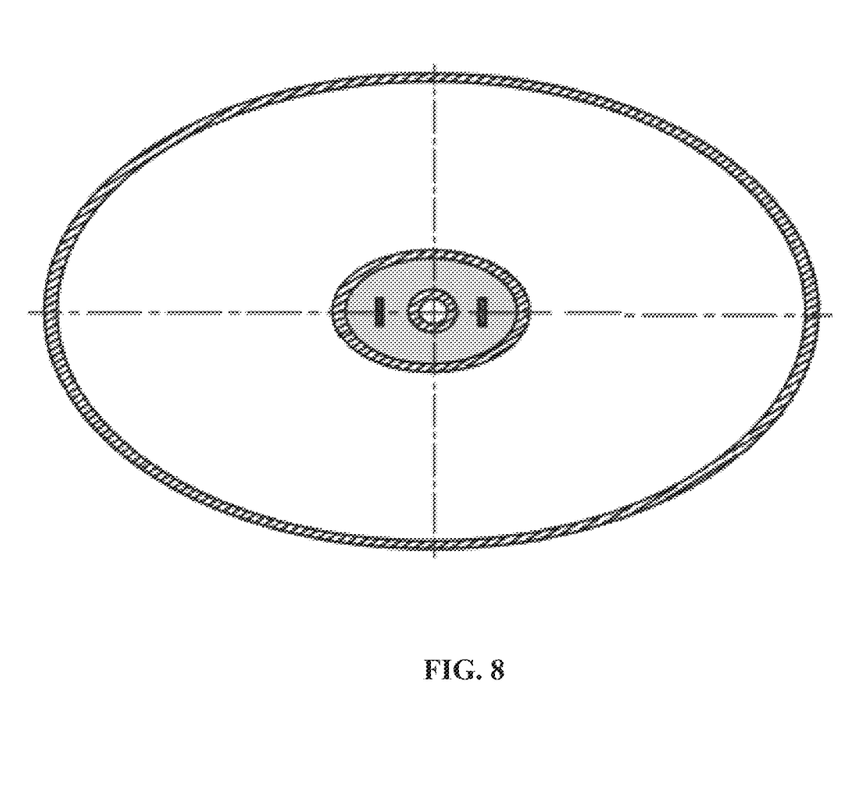
FIG. 8 is a schematic diagram of a cross section of a battery in accordance with one example of the disclosure
Figure 9:
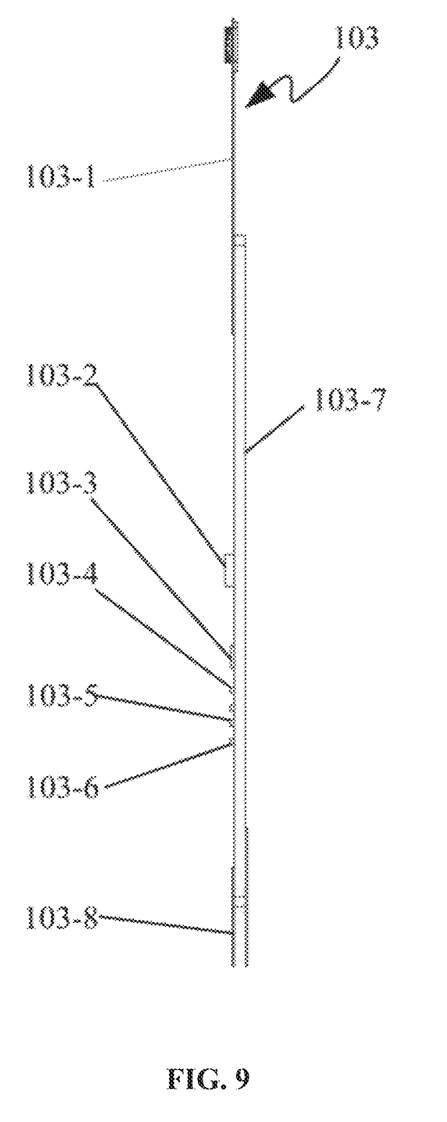
FIG. 9 is a first schematic diagram of an integrated circuit device in accordance with one example of the disclosure.
Figure 10:
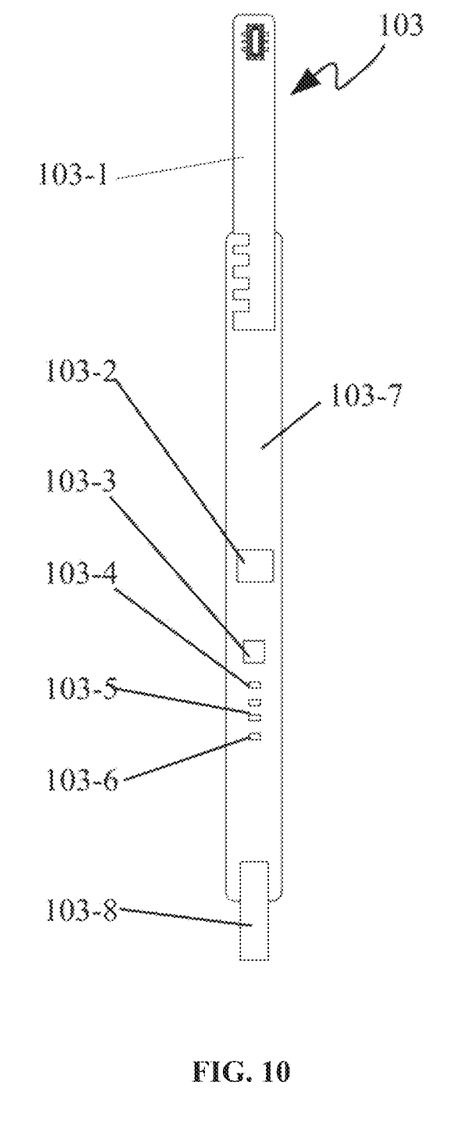
FIG. 10 is a second schematic diagram of an integrated circuit device in accordance with one example of the disclosure.
Figure 11:
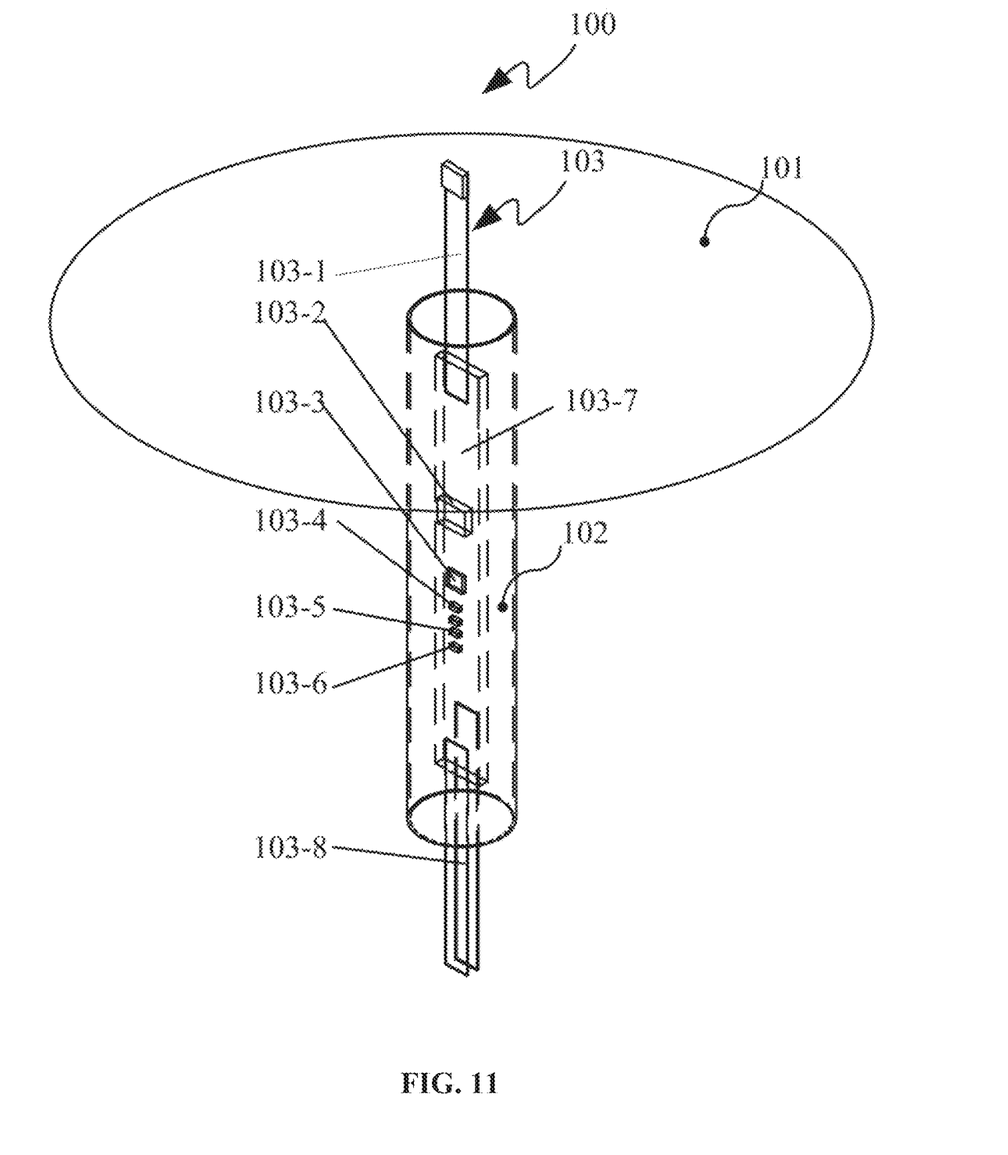
FIG. 11 is a schematic diagram of a position relationship between an integrated circuit device and a housing in accordance with one example of the disclosure.

As shown in FIG. 8, the battery of the disclosure has a cross section in the shape of a circle, an ellipse, and etc.

Preferably, the battery is a cylindrical lithium-ion battery.

The electrode assembly 200 of the disclosure is similar to the traditional cylindrical batteries, that is, at least one positive electrode 201, at least one negative electrode 202, and a diaphragm 203 that separates the positive and negative electrodes, are coaxially spirally wound to form an electrode assembly 200. The positive electrode 201 commonly comprises a foil-shaped (or mesh-shaped) metal current collector and an active material coated on the surface of the metal current collector. Preferably, the foil material comprises aluminum (or aluminum alloy), and the active material is selected from the group consisting of lithium cobaltate, phosphoric acid lithium iron, lithium manganate, lithium titanate, NCM ternary material, NCA ternary material, and a combination thereof. The negative electrode 202 commonly comprises a foil-shaped (or mesh-shaped) metal current collector and an active material coated on the surface of the metal current collector. Preferably, the foil material comprises copper (or copper alloy), and the active material is selected from the group consisting of carbon material, titanic acid lithium, lithium, or a combination thereof. The diaphragm 203 is preferably a plastic film, and more particularly a polyolefin film, such as a polyethylene film. The diaphragm 203 can also be a multilayer structure, such as ceramic, polyethylene, and ceramic. The positive electrode, the negative electrode, and the diaphragm are typically in the form of a flat strip, and spirally wound in an order to form the electrode assembly 200. The components in the electrode assembly are arranged in the following orders: the positive electrode/the diaphragm/the negative electrode/the diaphragm, or the negative electrode/the diaphragm/the positive electrode/the diaphragm. Regardless of a winding method, after the winding is completed and a winding needle is pulled out, a central hole is formed in the center of the electrode assembly. The diameter of the central hole is equal to that of the winding needle and is usually greater than 1 mm.

It should be noted that the dimensions of the battery housing 300, the electrode assembly 200, the central hole, and the pin assembly 100 are determined according to the conventional knowledge of the person skilled in the art, and are not described in detail again.

Taking the battery of Example 1 as an example, a method for preparing the battery is detailed as follows:

Polypropylene plastic is injected into the housing 101 by injection molding to form the insulating part 102, which completely wraps around the PCB hard board disposed in a power management component, and partially wraps a FPC soft board in the power management component. The rest part is led out from the upper end and is directly connected to an electronic component interface. Two tab adapters 103-8 in the power management component are partially wrapped, and the rest part is led out from the lower end thereof and is conductively connected to the positive electrode and the negative electrode. In addition, the insulating part 102 is tightly connected to the inner wall of a metal housing 101.

The housing 101 is inserted into the central hole. The two tab adapters 103-8 are bent outward and soldered to the first transition conductor 204 and the second transition conductor 205, respectively. The electrode assembly 200 is integrated with the pin assembly 100 and is then disposed in the battery housing 300 containing the electrolyte. The pin assembly 100 is soldered to the battery housing 300 through a laser soldering process, thus forming a ring-shaped cavity for accommodating the electrode assembly 200.

Following the aforesaid operations, the battery is then performed with general procedures such as formation and sorting to form a cylindrical chargeable and dischargeable secondary lithium-ion battery.

It will be obvious to those skilled in the art that changes and modifications may be made, and therefore, the aim in the appended claims is to cover all such changes and modifications.

What is claimed is:

1. A battery, comprising:
   an electrode assembly, the electrode assembly comprising a central hole, at least one positive electrode, at least one negative electrode, and at least one diaphragm separating the at least one positive electrode from the at least one negative electrode;
   a pin assembly disposed in the central hole for power management, and the pin assembly comprising a housing comprising an axial through hole, and at least one integrated circuit device disposed in the axial through hole; and
   a battery housing;
   wherein:
   the at least one positive electrode, the at least one negative electrode and the at least one diaphragm are disposed around the central hole in a spiral winding manner; and the central hole has a diameter of greater than 0 and smaller than that of the battery;
   the housing is partially or fully disposed in the central hole; the at least one integrated circuit device comprises at least one access terminal and one output terminal; the at least one positive electrode and/or the at least one negative electrode is conductively connected to the access terminal, thus achieving polarity separation and power management function of the battery; and
   the battery housing is hermetically connected to the housing, thus forming a ring-shaped sealed cavity for accommodating the electrode assembly.

2. The battery of claim 1, wherein the housing has a longitudinal section in the shape of "][" and comprises a tube and a disc-shaped flange extending outwardly from a top of the tube, and the axial through hole is disposed in the tube.

3. The battery of claim 2, wherein the battery housing has a U-shaped longitudinal section and a circular cross section.

4. The battery of claim 1, wherein the housing has a longitudinal section in the shape of "⊓⊓" and comprises a tube and two circular tubes extending outwardly from two end of a top of the tube, and the axial through hole is disposed in the tube.

5. The battery of claim 4, wherein the battery housing is in the shape of a disc, and has a longitudinal section in the shape of "-".

6. The battery of claim 1, wherein the housing has a longitudinal section in the shape of "||" and comprises a circular tube, and the axial through hole is disposed in the circular tube.

7. The battery of claim 6, wherein the battery housing has a longitudinal section in the shape of "⊏⊐".

8. The battery of claim 1, further comprising a liquid injection hole for injecting electrolyte into the battery.

9. The battery of claim 8, wherein the liquid injection hole is disposed in the central hole and/or is disposed on a disc-shaped flange and/or on the battery housing, and/or is a gap between the pin assembly and the battery housing before sealing.

10. The battery of claim 9, wherein the liquid injection hole is sealed with a sealing member to prevent the electrolyte from leaking out through the liquid injection hole.

11. The battery of claim 10, wherein the sealing member comprises one of the following structures:
    the sealing member comprises an end cap structure; the end cap structure comprises an end and an embedded part disposed on a lower end of the end; the end covers the liquid injection hole, and the embedded part is disposed in the liquid injection hole; and
    the sealing member comprises at least one steel ball; and the at least one steel ball is disposed in the liquid injection hole in an interference fit.

12. The battery of claim 1, wherein the battery is a lithium-ion battery and further comprises at least one lithium intercalated electrode.

13. The battery of claim 1, wherein the at least one positive electrode, the at least one negative electrode, and the at least one diaphragm each are in the form of a flat strip.

14. The battery of claim 1, wherein components in the electrode assembly are arranged in the following orders: the negative electrode/the diaphragm/the positive electrode/the diaphragm; or the positive electrode/the diaphragm/the negative electrode/the diaphragm.

15. The battery of claim 1, wherein the pin assembly and the battery housing comprise a waterproof material.

16. The battery of claim 15, wherein the waterproof material is a metal material or a non-metal material.

17. The battery of claim 16, wherein the metal material is stainless steel, aluminum, or aluminum alloy.

18. The battery of claim 16, wherein the non-metal material is ceramic or plastic.

19. The battery of claim 1, wherein the at least one integrated circuit device comprises a protective part and a connection part.

20. The battery of claim 19, wherein the protective part comprises one or more of the following elements:
    an integrated circuit (IC) chip for monitoring a voltage and current of a closed loop of the battery;
    a metal-oxide-semiconductor field-effect transistor (MOS) protection circuit module configured to open and close the closed loop of the battery;
    a resistor for voltage division and current limiting;
    a capacitor for voltage stabilization;
    a negative temperature coefficient (NTC) thermistor; and
    a positive temperature coefficient (PTC) thermistor.

21. The battery of claim 19, wherein the connection part comprises a printed circuit board (PCB), a flexible printed circuit (FPC), a connector, and a nickel tape.

22. The battery of claim 1, wherein the battery has a circular or elliptical cross section.

23. The battery of claim 1, wherein the pin assembly further comprises an insulating part for separating the housing from the at least one integrated circuit device.

* * * * *